(12) United States Patent
Ruhnke

(10) Patent No.: US 6,431,461 B1
(45) Date of Patent: Aug. 13, 2002

(54) TAPERED AIR PURGING CIRCULATOR

(76) Inventor: John Ruhnke, One Thistle Rd., Norwalk, CT (US) 06851

(*) Notice: Subject to any disclaimer, the term of this patent is extended or adjusted under 35 U.S.C. 154(b) by 0 days.

(21) Appl. No.: 09/845,644

(22) Filed: Apr. 30, 2001

Related U.S. Application Data

(60) Provisional application No. 60/203,139, filed on May 8, 2000.

(51) Int. Cl.[7] .................................................. F24D 3/02
(52) U.S. Cl. ........................................ 237/63; 415/168
(58) Field of Search .............................. 237/63, 16, 68; 417/435, 313; 96/196, 197, 220; 415/168, 205

(56) References Cited

U.S. PATENT DOCUMENTS

| | | | |
|---|---|---|---|
| 2,146,532 A | * 2/1939 | Crane et al. | 126/343.5 A |
| 3,074,645 A | 1/1963 | Main | 237/63 |
| 3,271,933 A | 9/1966 | Harker et al. | 55/203 |
| 3,276,188 A | * 10/1966 | Carlson | 123/41.42 |
| 3,290,864 A | 12/1966 | Harker et al. | 55/203 |
| 3,377,778 A | 4/1968 | Gaertner | 328/233 |
| 3,397,512 A | * 8/1968 | Webb | 96/211 |
| 3,472,453 A | * 10/1969 | Markland et al. | 237/63 |
| 3,535,854 A | * 10/1970 | Taylor | 237/63 |
| 4,201,555 A | * 5/1980 | Tkach | 95/15 |
| 4,358,299 A | 11/1982 | Jensen et al. | 55/204 |
| 4,381,928 A | 5/1983 | Roffslsen | 55/170 |
| 4,447,189 A | 5/1984 | Jensen et al. | 415/168 |
| 4,609,385 A | * 9/1986 | Burgess | 96/196 |
| 4,775,292 A | 10/1988 | Jensen et al. | 415/168 |
| 4,787,816 A | 11/1988 | Jensen et al. | 415/168 |
| 5,123,938 A | 6/1992 | Nobel | 55/170 |
| 5,490,874 A | 2/1996 | Kuster et al. | 96/204 |
| 5,501,246 A | 3/1996 | Burns et al. | 137/179 |
| 5,660,618 A | * 8/1997 | Park | 95/262 |
| 6,129,523 A | 10/2000 | Ruhnke | 417/313 |

FOREIGN PATENT DOCUMENTS

| | | |
|---|---|---|
| DE | 1937119 | 2/1971 |
| DE | 23 46 286 | 9/1973 |
| DE | 31 09 918 | 3/1981 |
| NO | 71 962 | 4/1947 |

OTHER PUBLICATIONS

Brochure "Spirovent Air Eliminators, Solving Those 'Impossible' Air Problems Once and Forever!".

* cited by examiner

*Primary Examiner*—Harold Joyce
*Assistant Examiner*—Derek S. Boles
(74) *Attorney, Agent, or Firm*—St. Onge Steward Johnston & Reens LLC

(57) ABSTRACT

An air purging circulator is provided with a frustoconical reservoir, which promotes separation of dissolved and captured air form the water in a hydronic home heating system, to prevent stalling of the circulator and reduction or elimination of noise associated with air contained in the hydronic system.

15 Claims, 5 Drawing Sheets

TAPERED AIR PURGING CIRCULATOR

PRIOR APPLICATION

I claim priority benefits under 35 U.S.C. §119(e) of U.S. Provisional Patent Application Ser. No. 60/203,139 filed May 8, 2000.

BACKGROUND OF THE INVENTION

Air can enter a hydronic (hot water) heating system in number of ways. Most typically, air enters the system as a result of some repair or replacement of a component of the system. If, for example, a boiler is replaced, the entire system typically must be drained and refilled with water.

The removal of air in a hot water heating system is conventionally done in two steps. The first step is to remove the large pockets of air by purging the system with a hose. The second step is to remove the left-over smaller pockets of air by an air scoop or microbubbler.

In the first step, a shut-off valve is opened on the fill line leading to the boiler and the system is filled until 12 psi is reached. Then a hose is attached to a drain valve in the system piping and the shut-off valves for each split, off of each zone, are closed. The drain valve is opened and the pressure is increased in the system by adjusting the fill valve to let water into the system. If that doesn't work, the fill valve must be bypassed with a double-end hose. Most of the time the drain valves are not properly placed to do this. The water is then circulated through the system until new water replaces the water already in the system. The hose is then moved to the next drain valve and the step of circulating water to replace existing water with new water is repeated for each split of each heating loop. This task takes 1.25–2.5 hours and must be added to every repair done in the system. If the fill valve breaks due to excessive pressures during filling of the system, the entire process may have to be repeated.

In the second step, after the biggest pockets of air are gone, small bubbles remain, causing gurgling noises in the pipes of the hot water system. These small bubbles are removed by air scoops or microbubblers installed in the system. If properly installed, these devices will eventually purge most of the remaining air within 24 hours and the system should circulate smoothly and quietly.

If the smaller bubbles are not removed, they can accumulate into bigger pockets of air. These large pockets of air, if they are drawn through the system to the impeller chamber of the circulator, can cause stalling of circulation of the water through the system, so that no heat is delivered to the radiators located downstream of the circulator. In other cases, the air pocket can become trapped in one of the zones of the heating system, preventing circulation through that zone. If these problems occur in the winter, there is the possibility of the pipes freezing and bursting if the problems are not promptly solved.

A number of systems have been proposed to provide gas separation equipment in a hyrdronic heating system, but to date, none of the proposed systems have been suitable for use in retrofit applications, i.e., installation into preexisting hydronic heating systems. Thus, the system in U.S. Pat. No. 3,290,864 is complicated, and would require expensive repiping to install in a preexisting system due to the non-standard positioning of the pump inlet and outlet; and due to the inability to install the pump where system piping is run close to a wall. The system in U.S. Pat. No. 4,775,292 is not suitable for orientation in more than one direction, thus limiting its application to limited situations where a preexisting circulator pump is oriented in the same way as the intended use of the system shown in this patent. In addition, this system would not be useful to install the pump where system piping runs close to a wall.

More recently, I have invented a new design for a retrofit circulator, as disclosed in U.S. Pat. No. 6,129,523, issued Oct. 10, 2000, which provides a circulator for hydronic systems which can automatically remove air in the system, without need for laborious hose purging of the system, and which is suitable for retrofit applications regardless of the positioning or orientation of the existing circulator or piping in the system.

The present invention improves upon and extends this original design.

SUMMARY OF THE INVENTION

In accordance with one embodiment of the invention, an air purging circulator comprises a pump housing which is tapered from an inlet end to a pump end. In the preferred embodiment, the housing is a horizontal frustoconical shape, similar to a coffee cup positioned on a horizontal axis. The circulator has an inlet aperture and an outlet aperture at one end, generally axially aligned with each other. The inlet leads to a reservoir and from there to an impeller chamber. The impeller chamber is at one end of the housing and contains an impeller driven by an electric motor at an end of the circulator opposite from the end containing the inlet and outlet. The impeller chamber preferably connects to the outlet aperture in the pump housing by a curved passageway that extends from the impeller chamber to the outlet aperture.

The air purging circulator is particularly well adapted to use in retrofit of existing systems, even where piping is close by a wall. Preferably, the distance between the inlet and outlet apertures of the pump housing is selected to match the distance between flanges in conventional circulators, to allow easy retrofit.

The air purging reservoir is sized to provide reduction of the velocity of the circulating water in the hydronic system as it passes through the air purging reservoir on the suction side of the reservoir. This location has the lowest pressure within the system, and thus, the least amount of dissolved air in the circulating water. The air contained in the circulating water separates from the circulating water and, due to the frustoconical shape of the reservoir, collects in an upper portion of the air purging reservoir. The air purging reservoir has an air vent provided in the upper portion thereof to release the air collected in the reservoir. Preferably, the air purging reservoir is provided with four apertures positioned at 90° intervals around a peripheral wall thereof. In this way, the air purging circulator may be oriented in any direction and the air vent will be positioned on the upper portion of the air purging reservoir.

In a preferred embodiment, the reservoir contains a separation media, such as a plate, marbles, wire mesh, or crumpled wire, to further slow the water flow and enhance separation of the air from the water.

Other objects, aspects and features of the present invention in addition to those mentioned above will be pointed out in or will be understood from the following detailed description provided in conjunction with the accompanying drawings.

DETAILED DESCRIPTION OF THE DRAWINGS

Figure 1:
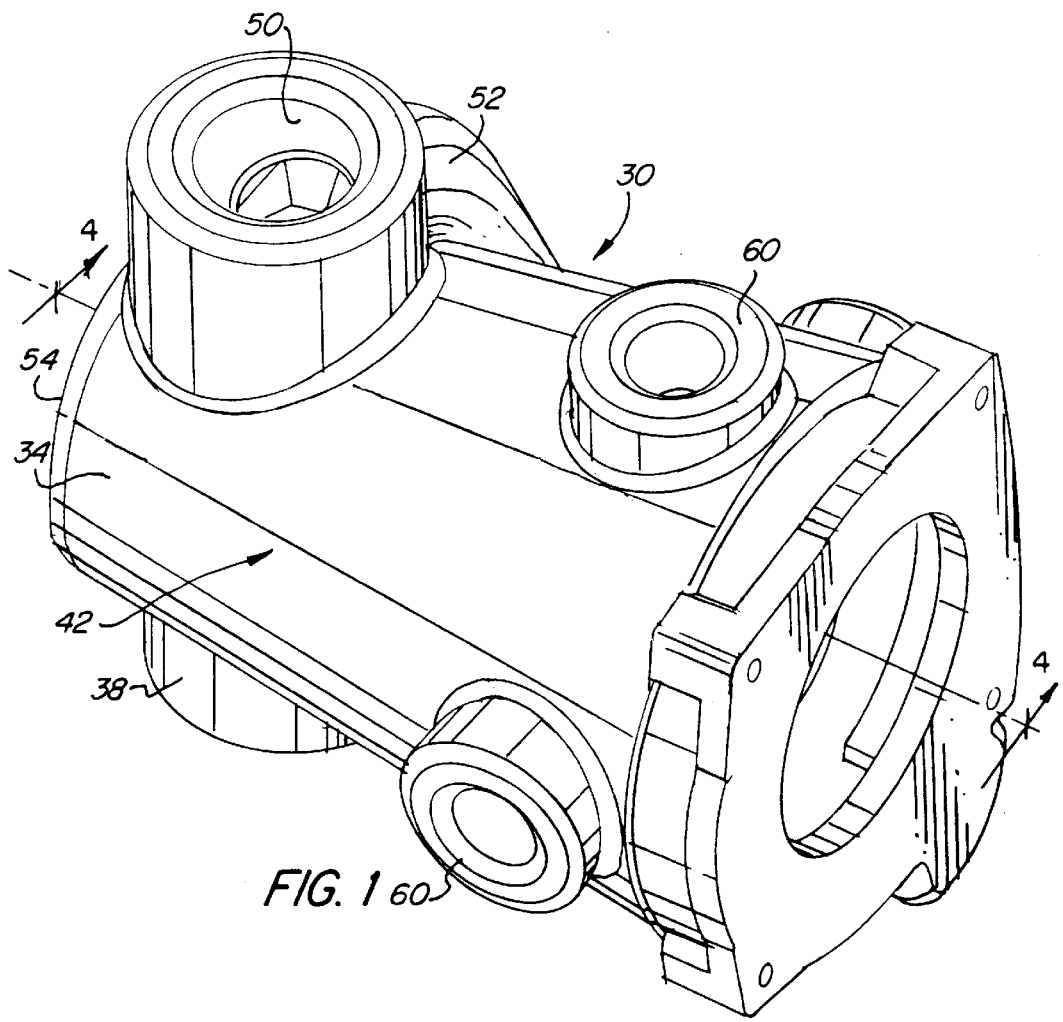
FIG. 1 is a top, front and left side perspective view of a first embodiment of an air purging circulator in accordance with the invention.

The present invention has particular application in hydronic heating systems, i.e., circulating hot water heating systems found in many homes. Referring now to FIGS. 1–6E, an air purging circulator 30 for a hydronic heating system is shown. In the Figures, the same numbers refer to like elements in the different embodiments.

Circulator 30 comprises an electric motor 32 (not shown), a pump housing 34, and an impeller 36 (not shown). Pump housing 34 has an inlet aperture 38 leading to an air purging reservoir 42. An outlet from the air purging reservoir 42 has an outlet aperture 44 connected to an impeller chamber 46, such that the reservoir 42 is on the upstream, or suction side, of the impeller chamber 46. Impeller chamber 46 is connected by a passageway 48 to an outlet aperture 50 in pump housing 34. The impeller chamber 46 preferably connects to the outlet aperture 50 in the pump housing 34 by a curved tube 52 that extends from the impeller chamber 46, to the outlet aperture 50.

Impeller 36 for pumping water in the hydronic heating system is operably connected to motor 56. Impeller 36 is located within impeller chamber 46. Thus the air purging reservoir 42 is located on the suction side of the impeller 36 in circulator 30.

Inlet aperture 38 and outlet aperture 50 are axially aligned, so that the circulator 30 may be installed in retrofit applications in place of an existing conventional circulator without requiring repiping, drainage of the system, or other time-consuming and expensive alterations of the existing hydronic heating system. Moreover, the distance between aperture 38 and outlet aperture 50 is selected to be consistent with industry standards for existing circulators, to simplify installation of the circulator 30 into an existing hydronic heating system. Flanges are preferably associated with the inlet aperture 38 and outlet aperture 50 and are preferably secured in a manner allowing rotation of the flanges relative to the housing this manner, the air purging circulator 30 can easily be retrofitted into existing systems that have mating flanges on installed pipes, because the flanges on the circulator 30 may easily be oriented to match up with the existing flanges in the preexisting heating system. Rotation of the flanges of the inlet and outlet apertures 38, 50 may be provided by a threaded connection between the flange and a nipple extending from the circulator 30, or by a retaining collar for the flange having sealing means between the flange and the collar.

Figure 2:
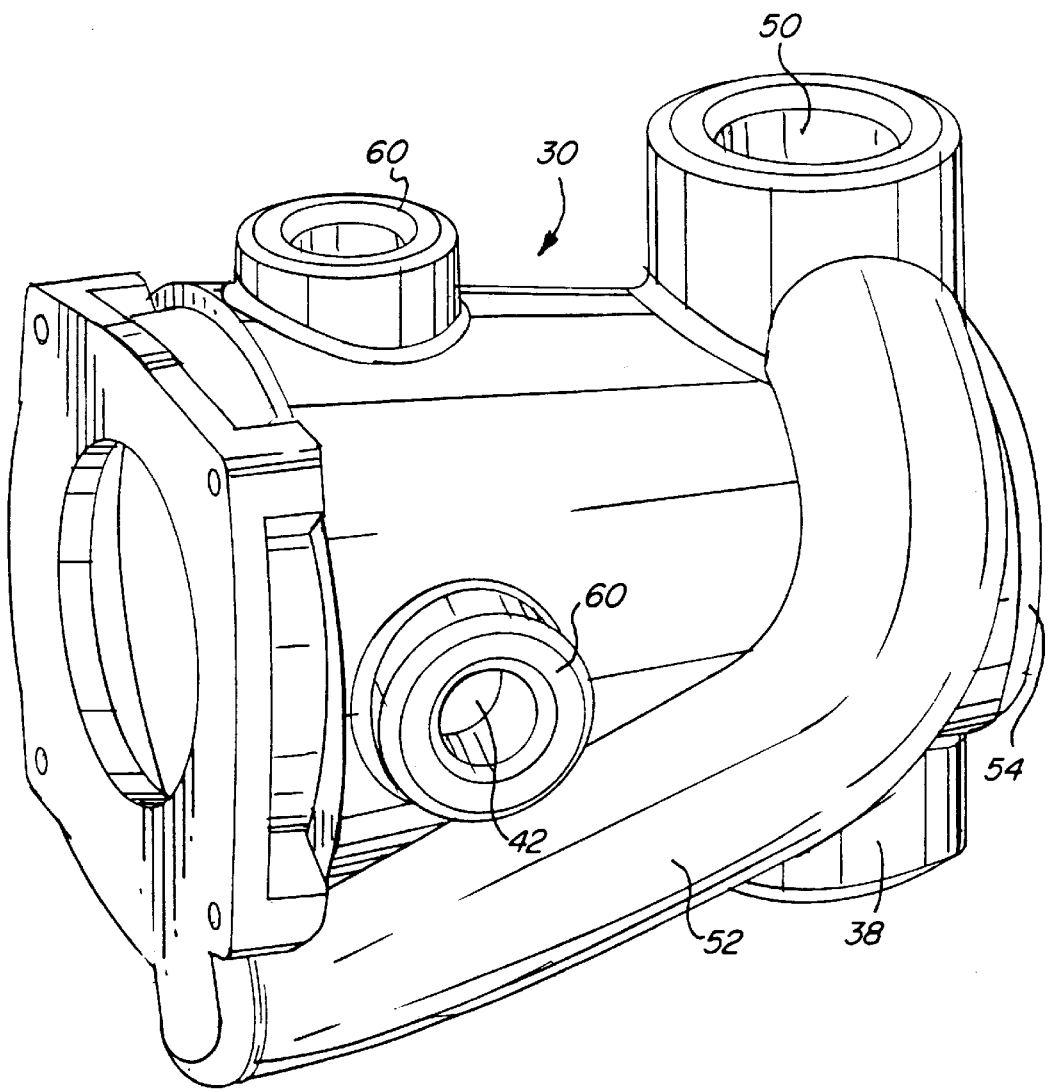
FIG. 2 is a top, front and right side perspective view of the embodiment of an air purging circulator of FIG. 1.
Figure 3:
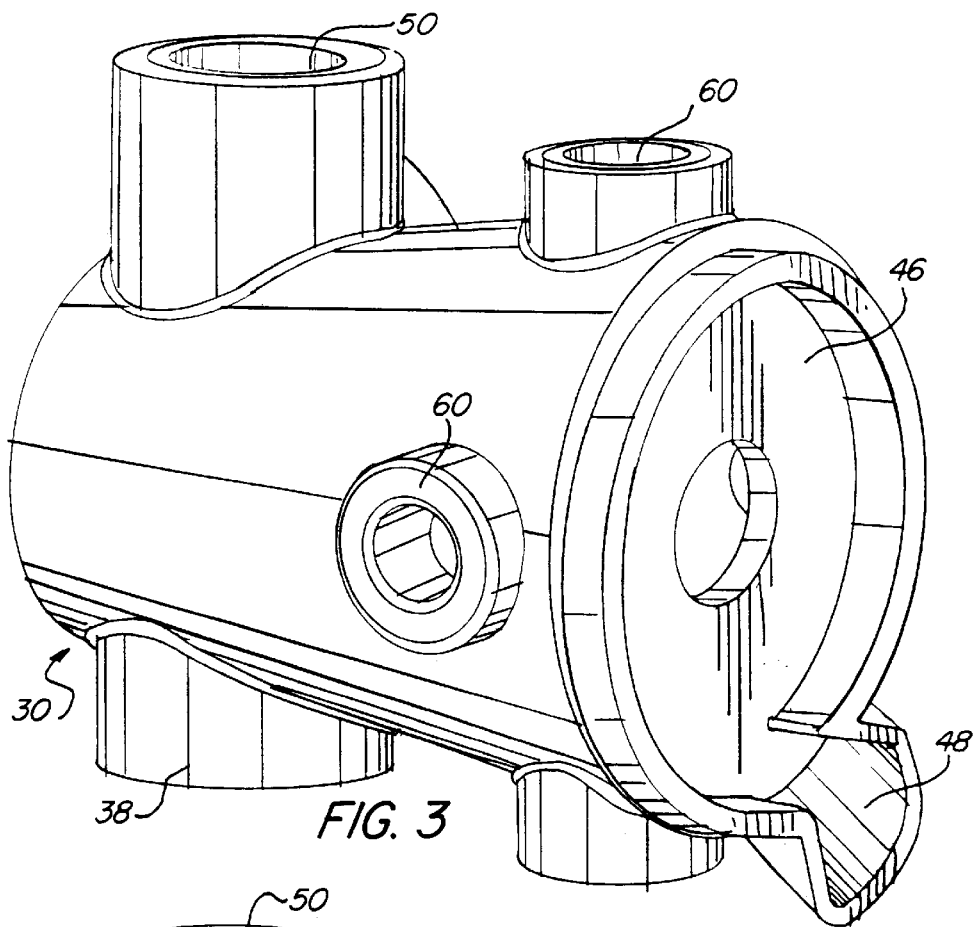
FIG. 3 is a perspective view of the embodiment of an air purging circulator of FIG. 1.
Figure 4:
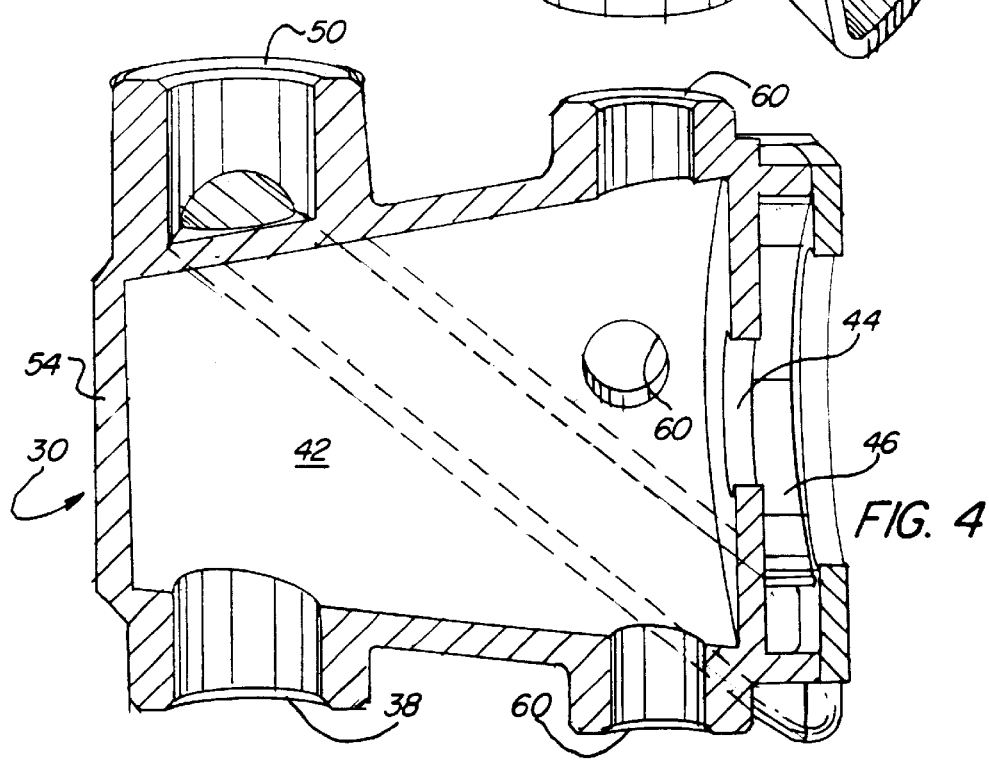
FIG. 4 is a cross-sectional view of the embodiment of an air purging circulator of FIG. 1.
Figure 5:
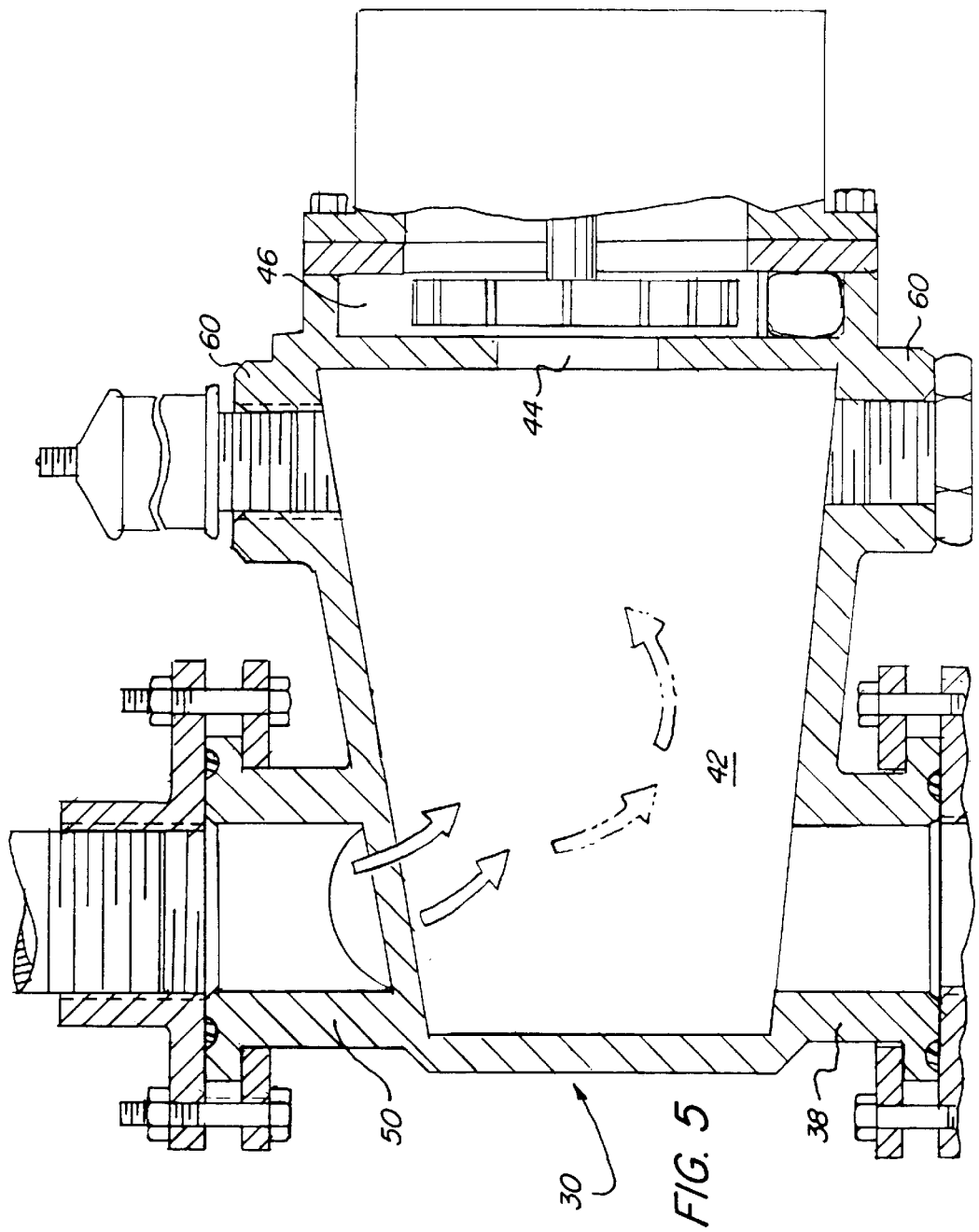
FIG. 5 is a cross-sectional view of the embodiment of an air purging circulator of FIG. 1.
Figure 6A:
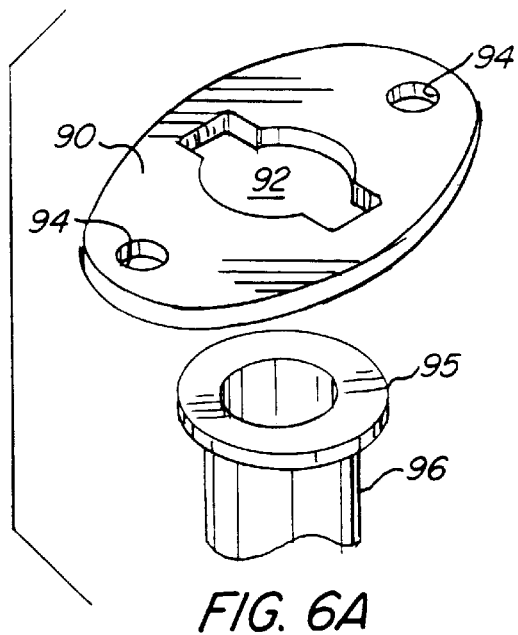
FIG. 6A is a top and side perspective view of a flange for mounting to a flanged pipe in an air purging circulator.
Figure 6B:
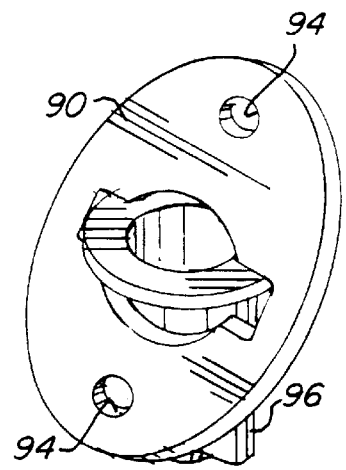
FIG. 6B is a top and side perspective view of the first step of mounting the flange to a flanged pipe in an air purging circulator.
Figure 6C:
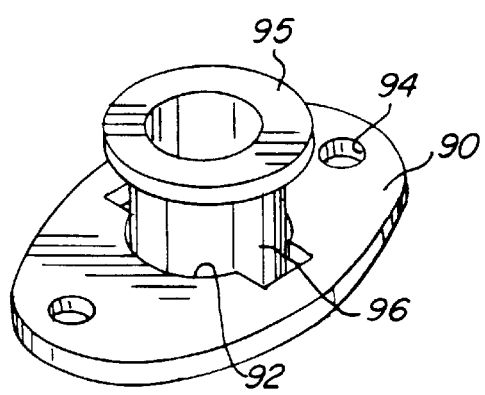
FIG. 6C is a top and side perspective view of the second step of mounting the flange to a flanged pipe in an air purging circulator.
Figure 6D:
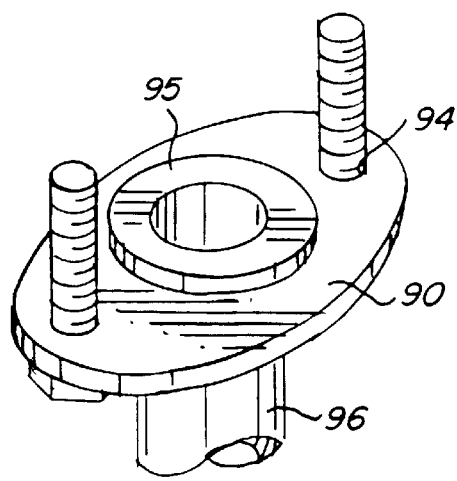
FIG. 6D is a top and side perspective view of the third step of mounting the flange to a flanged pipe in an air purging circulator.
Figure 6E:
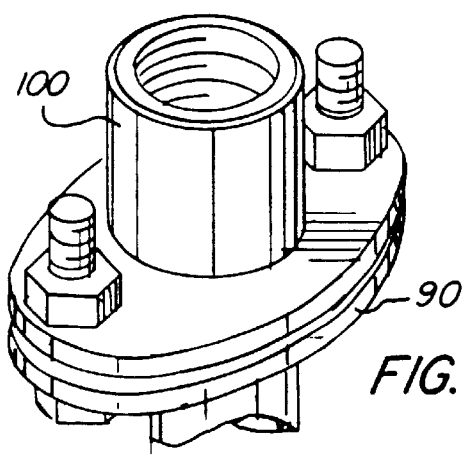
FIG. 6E is a top and side perspective view showing the completed mounting the flange to a flanged pipe in an air purging circulator and assembly with another flanged pipe.

In preferred embodiments, shown in FIGS. 1 and 2, the inlet aperture 38 and outlet aperture 50 are positioned on one end of air purging reservoir opposite from the motor 12. This configuration provides the added advantage of fitting the circulator 30 into tight spaces, as where existing piping is fitted close to a wall. The provision of the inlet aperture 38 and outlet aperture 50 at end 54 of air purging reservoir 30 allows the circulator 30 to fit into the existing space, very nearly flush against a wall, where piping is fitted close to the wall. As noted above, in the embodiment of FIG. 1, a curved tube 52 preferably connects the impeller chamber 46 to the outlet aperture 50 of pump housing 34. The curved tube 52 is a smooth gradually curved tube to provide a smooth transition from the impeller chamber 46 to the outlet 50, and is believed to have a better flow rate and to reduce turbulence and mixing of air into the water than a system where a winding path is provided from the impeller chamber to the outlet.

Housing 34 and reservoir 42 contained therein have a tapered diameter along their axial length. The Figures show a preferred embodiment where housing 34 and reservoir 42 are frustoconical in shape along their horizontal axis. The frustoconical shape, similar to a coffee cup laid on its side, enhances the separation of air from the circulating water, and encourages the separated air to rise up and exit through the uppermost of the vent apertures 60.

The air purging reservoir 42 is provided with four threaded vent apertures 60 around a peripheral wall thereof at positions 90° apart, for connecting air vent 64 to the air purging reservoir 42 using a nipple 66. The apertures 60 are aligned with the axis of the inlet and outlets 38 and 50 and at positions 90° away therefrom. The provision of vent apertures 60 at these positions allows the air purging circulator 30 to be oriented in any direction, and the air vent 64 can be installed in the upper portion 62 of the air purging reservoir 42. The apertures 60 that are not used for the air vent 64 will be plugged with a suitable threaded plug 68.

The air purging reservoir 42 is sized to permit reduction of velocity of water in the hydronic system, and is located to remove air at the point of lowest pressure in the system. This causes air bubbles contained in the water to separate from the water by and to be collected in an upper portion 62 of the air purging reservoir 42. The air purging reservoir 42 has an air vent 64 provided in the uppermost of the vent apertures 60 to release air collected in the air purging reservoir 42.

The air purging circulator may be an empty space; however, in one embodiment, the air purging circulator 30 contains media that assists in inducing the separation of air from the water. Baffle plates may also be used in lieu of separation media. Separation media may comprise a randomly stacked series of spherical materials such as marbles or it may comprise packings of the type used in packed towers as are known in the art of chemical process equipment, or it may comprise a mesh or other material, such as a crumpled wire media. The separation media acts to divert the water flow into numerous paths, further reducing the water velocity, to allow further residence time for separation of air bubbles from the water.

A summary of the operation of the circulator of the invention is as follows. An air/water mixture in a hydronic heating system enters the circulator through aperture 38 in housing 34, then enters the air purging reservoir 42. Air purging reservoir 42 is sized sufficiently large so as to allow the mixture to reduce its speed. Air released by the low pressure, or that is moving with the water, separates by gravity from the water and collects in the upper end 62 of the reservoir 42. The air is then vented out through automatic vent 64. Vent 64 does not allow water to pass therethrough. Vent 64 is attached to reservoir 42 by a nipple 66 screwed into threaded vent aperture 60. In a typical use, one air vent 64 will be installed in one of the apertures 60 after it is determined which aperture 60 will be topmost.

After separation of the air/water mixture in reservoir 42, the water flows into impeller chamber 46 by suction from the impeller. The amount of dissolved air in the water in impeller chamber 46 is significantly lower than the amount of air in the water entering reservoir 42. The water in impeller chamber 46 does not contain enough air to stall the system. (In prior art systems the entire heating system would stall if enough air entered impeller chamber 46, so that the impeller was spinning in the trapped air instead of pumping water through the system.) After a few cycles of the water through the air purging circulator 30 the smaller pockets of air disappear, eliminating banging and other noises associated with air in the hydronic system.

Referring now to FIGS. 6A–6E, a preferred embodiment for retrofit of the circulator of the invention into an existing home hydronic system is shown. A flange 90 is provided with a central opening 92, which has cutout sides, and conventional bolt holes 94. Opening 92 is sized to fit over the lip 95 of the flaring tube end 96 in the circulator. The cutout sides allow the flange to be oriented and manipulated to a position inward of the lip 95, so that the flange 90 may be retained on the tube end 96, all as shown in the series of steps at FIGS. 6A–6E. Once the flange 90 is positioned in location, it may be bolted to the corresponding flange of a pipe 100.

Accordingly, the present invention provides a new and useful improvement in the filed of hydronic heating systems, by providing for elimination of dissolved air in the circulating water in the heating system.

I claim:

1. An air purging circulator for a hydronic heating system, comprising:

a motor;

a pump housing having an inlet aperture and an outlet aperture, said pump housing having a horizontal frustoconical shape tapering from said inlet end to said outlet aperture, said inlet aperture connecting to an air purging reservoir, said air purging reservoir having a horizontal frusto-conical shape conforming with said horizontal frustoconical shape of said pump housing, said air purging reservoir being on a suction side of an impeller chamber, an outlet from said air purging reservoir connecting to said impeller chamber, said impeller chamber connecting to said outlet aperture in said pump housing;

impeller means for pumping water in said hydronic heating system operably connected to said motor and located within said impeller chamber;

said air purging reservoir being sized to permit reduction of velocity of circulating water in the hydronic system through said air purging reservoir, air contained in the circulating water separating from the circulating water while passing through said air purging reservoir and collecting in an upper portion of said air purging reservoir, said air purging reservoir having an air vent provided in said upper portion thereof to release air collected in said reservoir.

2. An air purging circulator in accordance with claim 1 wherein said inlet aperture and said outlet aperture of said pump housing are axially aligned and are located at one end of said pump housing opposite from said motor.

3. An air purging circulator in accordance with claim 1 wherein said air purging reservoir is sized to provide a sufficient residence time of water in said reservoir to permit effective separation of air from the water.

4. An air purging circulator for a hydronic heating system in accordance with claim 3, wherein said air purging reservoir is provided with four apertures around a peripheral wall thereof for connecting said air vent to said air purging reservoir, whereby said air purging circulator may be oriented in any direction and said air vent may be positioned in said upper portion of said air purging reservoir.

5. An air purging circulator in accordance with claim 4, wherein said apertures are positioned at 90 degree intervals around said peripheral wall.

6. An air purging circulator in accordance with claim 1, wherein a smooth gradually curved tube connects said impeller chamber to said outlet aperture of said pump housing.

7. An air purging circulator in accordance with claim 1, wherein said impeller chamber is connected to said outlet aperture of said pump housing by a channel formed in said pump housing.

8. An air purging circulator in accordance with claim 1, wherein one or more of said inlet aperture and said outlet aperture are provided with a tubular body with a flaring tube end, and a flange is mounted on said flaring tube end, said flange being generally oval with a central opening with cutout sides permitting said flange to be mounted to or removed from said flaring tube end.

9. An air purging circulator for a hydronic heating system, comprising:

a motor;

a pump housing having an inlet aperture and an outlet aperture, said inlet aperture connecting to an air purging reservoir, said air purging reservoir having a horizontal frustoconical shape tapering along its axial length from said inlet aperture to an outlet from said air purging reservoir, said air purging reservoir being on a suction side of an impeller chamber, said outlet from said air purging reservoir connecting to said impeller chamber, said impeller chamber connecting to said outlet aperture in said pump housing; said inlet aperture and said outlet aperture of said pump housing being axially aligned and being located at one end of said pump housing opposite from said motor;

impeller means for pumping water in said hydronic heating system operably connected to said motor and located within said impeller chamber;

said air purging reservoir being sized to permit reduction of velocity of circulating water in the hydronic system through said air purging reservoir, air contained in the circulating water separating from the circulating water while passing through said air purging reservoir and collecting in an upper portion of said air purging reservoir, said air purging reservoir having an air vent provided in said upper portion thereof to release air collected in said reservoir.

10. An air purging circulator in accordance with claim 9 wherein said air purging reservoir is sized to provide a sufficient residence time of water in said reservoir to permit effective separation of air from the water.

11. An air purging circulator for a hydronic heating system in accordance with claim 10, wherein said air purging reservoir is provided with four apertures around a peripheral wall thereof for connecting said air vent to said air purging reservoir, whereby said air purging circulator may be oriented in any direction and said air vent may be positioned in said upper portion of said air purging reservoir.

12. An air purging circulator in accordance with claim 11, wherein said apertures are positioned at 90 degree intervals around said peripheral wall.

13. An air purging circulator in accordance with claim 9, wherein a smooth gradually curved tube connects said impeller chamber to said outlet aperture of said pump housing.

14. An air purging circulator in accordance with claim 9, wherein said impeller chamber is connected to said outlet aperture of said pump housing by a channel formed in said pump housing.

15. An air purging circulator in accordance with claim 9, wherein one or more of said inlet aperture and said outlet aperture are provided with a tubular body with a flaring tube end, and a flange is mounted on said flaring tube end, said flange being generally oval with a central opening with cutout sides permitting said flange to be mounted to or removed from said flaring tube end.

\* \* \* \* \*